Patented July 2, 1946

2,402,962

UNITED STATES PATENT OFFICE 2,402,962

PERTHIOCYANIC-ACID PIGMENT

William H. Hill, Mount Lebanon, Pa., assignor, by mesne assignments, to Koppers Company, Inc., a corporation of Delaware No Drawing. Application May 16, 1942, Serial No. 443,302

8 Claims. (Cl. 106—176)

The present invention relates to a novel, colored pigment that is chemically entirely organic in constitution.

An object of the present invention is to provide a novel and cheap yellow pigment that is chemically entirely organic in constitution and is compatible with a variety of commercial paint vehicles and coating compositions to form paints having good covering power and giving superior serviceability and protection to surfaces under conditions to which paints are normally subjected in use.

It is a further object of invention to provide a new yellow pigment that is suitable for use in divers paint vehicles, which are adapted for special applications to meet a variety of conditions and requirements, and that, in contrast to most yellow pigments containing metals, is not sensitive to the presence of hydrogen sulphide in the atmosphere.

The invention has for further objects such other improvements and such other operative advantages or results as may be found to obtain in the processes or apparatus hereinafter described or claimed.

It has now been found that the organic compound commonly called perthiocyanic acid and variously referred to and described in the literature as isoperthiocyanic acid, xanthane hydride, and imidothiodisulphazolidine, is of value for use as a pigment in paints, coating compositions, and the like. It possesses a golden-yellow color and advantageously is constituted only of non-metallic elements. As stated in Richter's Organic Chemistry (Allott's translation, 1934 edition), volume 1, page 524, "xanthane hydride or imidothiodisulphazolidine is prepared by decomposing a concentrated solution of thiocyanic acid, whereby hydrocyanic acid is driven off." It can also be prepared by treating more especially water soluble inorganic thiocyanate salts such, for example, as those of ammonia, sodium, potassium, calcium, barium, magnesium, zinc, aluminium, or the like, in aqueous solution with an acid under controlled conditions. The product so produced is predominantly a material having the empirical formula $C_2N_2H_2S_3$ and can exist in isomeric forms.

When a thiocyanate salt is treated with an acid strong enough to dissociate the said salt and produce free thiocyanic acid, the said acid is believed to polymerize to its dimeric and then trimeric forms and thereafter to produce one or the other or an admixture of the above-mentioned isomeric compounds along with hydrocyanic acid and carbon oxysulphide as by-products. The employed acid should preferably be non-oxidizing, since an oxidizing acid would in many cases oxidize the liberated thiocyanic acid directly to hydrocyanic acid and sulphuric acid or oxides of sulphur, before the essential polymerization steps take place.

It has been found that the so formed yellow material, which may be a single isomeric form or an admixture of isomeric forms of perthiocyanic acid, for example, isoperthiocyanic acid or xanthane hydride, is an excellent pigment for use in paints, varnishes, lacquers, enamels, natural and synthetic rubber and rubber-like materials, thermoplastic and thermosetting materials, and the like. For the sake of brevity the yellow-colored material prepared as above described will be hereinafter refered to as perthiocyanic acid.

This novel pigment is substantially insoluble in water and the more usual organic solvents, but it is soluble in bases such as pyridine and other amines. Due to its substantially non-toxic nature and fine yellow hue it can advantageously replace the more toxic yellow pigments, such as lead chromate and lead cyanamide, that have been employed in the past by the paint industry. The new pigment has a very high bulking value and grinds readily in various vehicles. Paints compounded therewith have good brushing and spraying properties, good covering power, and they do not darken or deteriorate under the influence of ultraviolet light, nor in an atmosphere containing hydrogen sulphide, the latter property making paints compounded therefrom useful for employment in industrial areas where lead pigments are unsatisfactory. This perthiocyanic acid pigment is also heat resistant up to and above temperatures at which most film-forming bases of paints themselves disintegrate. Although of acidic nature, it does not function as a polymerization catalyst at room temperatures in amino-plastic lacquers and compositions. It exerts a strong anti-oxidant effect and in those instances where it is employed, for example, with linseed oil it may be desirable, if preferred, to add an extra quantity of driers to hasten drying.

In a preferred method for preparing the perthiocyanic-acid pigment of invention, molar proportions of ammonium thiocyanate and sulphuric acid in the form of 60% and 75% aqueous solutions respectively, are admixed while maintaining the temperature of the admixture between about 35° C. and 40° C. From the admixture there begins gradually to segregate yellow precipitate, there being simultaneously formed some hydrocyanic acid, carbon oxysulphide, and also ammonium sulphate and ammonium bisulphate. After standing about 120 hours, the said yellow precipitate is filtered from the aqueous portion by any preferred means and the so-produced filter cake of the pigment material is re-suspended and dispersed in further quantities of water in order to extract water-soluble salts, that can include unconverted ammonium thiocyanate and those salts above mentioned. The final yield of perthiocyanic acid is between about 40% and 60% of the theoretically possible yield, the said yield depending amongst other factors on the speed of acid addition and the maximum temperature to which the admixture is allowed to rise. Other processes for the manufacture of perthiocyanic-acid pigment will be described in later filings of applications for patents in the names of the present and other inventors; they will describe methods of producing perthiocyanic-acid product in yields as high as 98% of theory and possessing divers color tones within a color range extending from lemon yellow to reddish brown. For purposes of the present invention the preparation of perthiocyanic acid made according to any other process is included within the scope of this invention.

The present novel pigment is of utility in a wide diversity of applications and vehicles and the following specific examples of its use are illustrative of the results obtainable by its employment.

Example 1

In a paint mill supplied with steel balls there was ground for a period of 24 hours an admixture comprising, by weight, the following ingredients: 400 parts perthiocyanic acid prepared as above described, 800 parts commercial bronzing liquor and 90 parts toluene. After the said period of grinding there was produced a paint of very smooth texture and having a clear yellow color with an orange tinge; it brushed very satisfactorily on steel panels and dried free of tackiness in about three days. Where like proportions of a commercial spar varnish replaced the bronzing liquor, there was obtained a paint very similar in appearance and properties.

Example 2

In a paint mill supplied with steel balls there was ground for a period of 24 hours an admixture comprising, by weight, the following ingredients: 600 parts of the said perthiocyanic-acid product, 800 parts of a commercial 100% phenolic varnish and 360 parts xylene. The resultant yellow paint had good drying speed with excellent brushing qualities and covering power.

Example 3

In a paint mill supplied with porcelain balls there was ground for a period of 24 hours an admixture comprising, by weight, 300 parts of the said perthiocyanic-acid product and 700 parts of lacquer of a thermoplastic cellulose derivative. The resulting lacquer had good drying speed, brushed well and had excellent, uniform covering power.

Example 4

In a paint mill supplied with steel balls there was ground for a period of 24 hours an admixture comprising, by weight, the following ingredients: 400 parts of the said perthiocyanic-acid product, 800 parts of a thermosetting lacquer of the urea-formaldehyde type and 180 parts toluene. It was observed that there was substantially no thickening of the said admixture at normal temperatures, indicating that the pigment had no precuring effect on the urea-formaldehyde lacquer. The resulting lacquer brushed well on panels, with good covering power and, after said panels were baked for about ½ hour at 145° C., there resulted excellently cured, smooth, enamel coatings.

Example 5

In a paint mill supplied with porcelain balls there were ground in parts by weight, 400 parts of the said perthiocyanic-acid product and 800 parts of a commercial melamine-formaldehyde lacquer. Here again no precuring effect was noted and the resulting lacquer brushed out easily with good covering power on a panel and cured well with a smooth hard coating on being baked for 15 minutes at 155° C.

The hereinabove-described examples are illustrative of some of the uses of perthiocyanic acid as a pigment for coating compositions, the perthiocyanic acid employed having been first produced by the preferred above-described method. As above described in the specific examples of its use, it can be successfully employed as a novel pigment in paints and lacquers. The properties of the resultant protective coating depend largely on the nature of the vehicle in which the pigment is suspended, and it is in general compatible with vehicles that dry both by air-oxidation thereof or by mere evaporation of a thinner, with or without added heating. The anti-oxidant effect of perthiocyanic acid does increase the drying time for the formation of a solid adherent covering when the drying relies solely on air oxidation of the vehicle, as illustrated in Example 1 above. However, this property of perthiocyanic acid can be employed to good advantage in those instances where it is desired to retard drying, as in the case with paints employing such extremely unsaturated and fast drying vehicles as, for example, tung oil. As shown, perthiocyanic acid is also useful as a pigment in such amino-plastic lacquers as the urea-formaldehyde and melamine-formaldehyde lacquers, and also in modified-cellulose vehicles, for example, cellulose esters and ethers. It is to be understood of course that perthiocyanic acid can be used not only alone but be admixed with other pigments, thereby to impart its characteristics to a resultant paint composition; it is also of utility when incorporated as pigment in molding compositions of the thermosetting and thermoplastic types, for example, with aminoplastic and cellulose molding compositions. In all instances, unless otherwise specifically stated in the claims, perthiocyanic acid is intended as a collective term that includes perthiocyanic acid or an isomer thereof or an admixture of perthiocyanic acid and its isomers.

The invention as hereinabove set forth is embodied in particular form and manner but may be variously embodied within the scope of the claims hereinafter made.

I claim:

1. A new mobile pigment composition comprising, a mobile pigment-carrying-vehicle medium capable of forming into a hard non-tacky film from its mobile state upon air drying or oxidation containing as an essential pigment ingredient perthiocyanic acid.

2. A new mobile pigment composition comprising, a mobile pigment-carrying-vehicle medium capable of forming into a colored solid adherent hard non-tacky film upon air drying or evaporation containing as an essential pigment ingredient perthiocyanic acid to the extent of 40 to 50% of the vehicle.

3. A colored composition of matter comprising a pigment-carrying-vehicle medium capable of forming into a colored solid hard non-tacky film from its mobile state and a coloring pigment comprising as an essential pigment ingredient perthiocyanic acid distributed throughout the medium.

4. As a new composition of matter, a paint comprising a mobile hard non-tacky film-forming vehicle in which perthiocyanic acid is dispersed as an essential pigment ingredient.

5. A freely flowing pigment suspension capable of forming into a colored solid adherent coating comprising a cellulose plastic vehicle and as an essential pigment ingredient perthiocyanic acid.

6. A coating composition, comprising an amino-plastic pigment carrying vehicle and as an essential pigment ingredient perthiocyanic acid.

7. As a lacquer, a composition comprising a cellulosic plastic lac and as an essential pigment ingredient perthiocyanic acid.

8. As a new composition of matter a pigment suspension comprising a water-insoluble thermo setting plastic having perthiocyanic acid distributed throughout the plastic.

WILLIAM H. HILL.